Jan. 6, 1959   A. V. ALEXEFF   2,867,399
UNIFORM TENSION PIPE SUPPORT
Filed Feb. 4, 1954   3 Sheets-Sheet 1

INVENTOR.
ALEXANDER V. ALEXEFF
BY Oldham & Oldham
ATTORNEYS

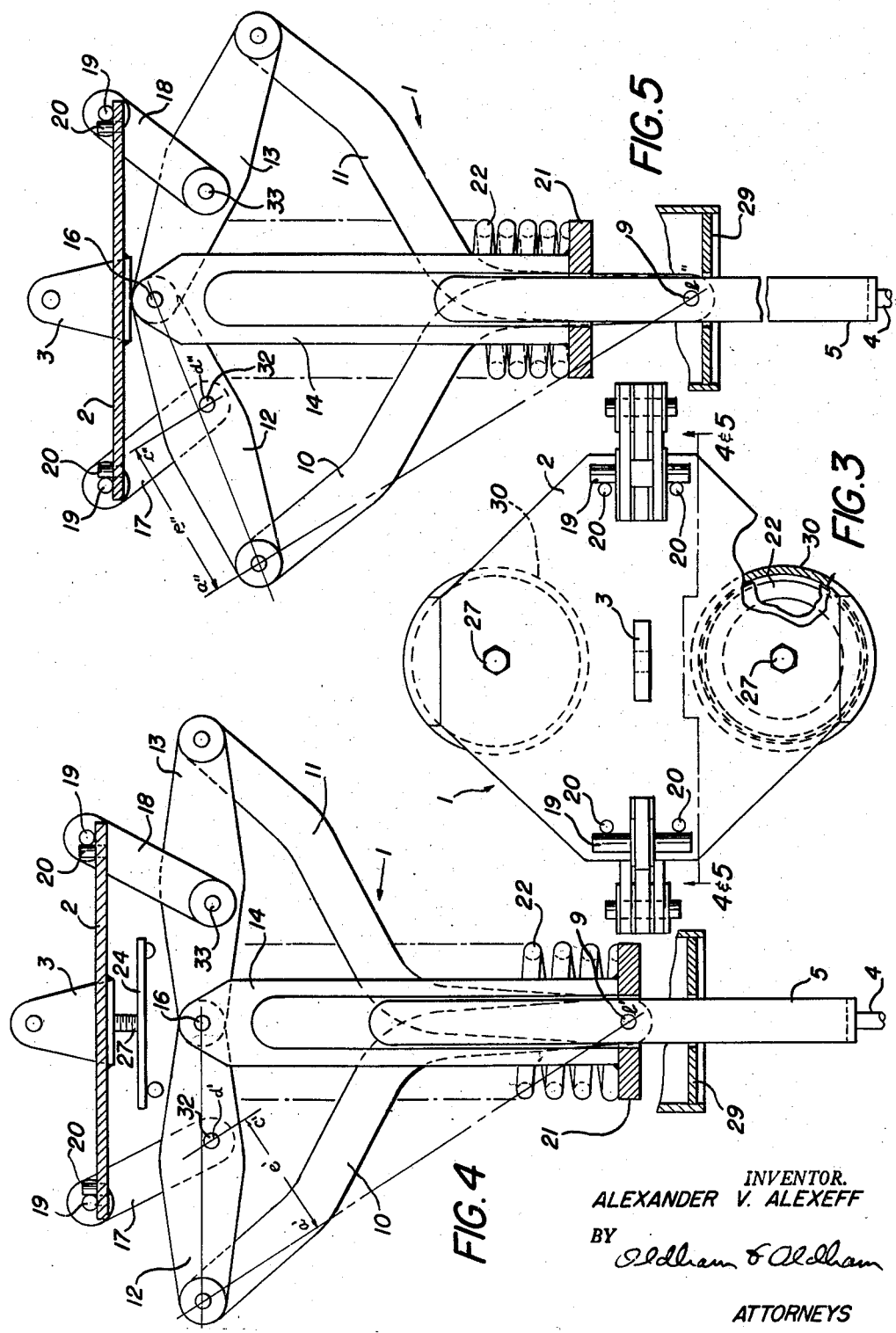

Jan. 6, 1959
A. V. ALEXEFF
2,867,399
UNIFORM TENSION PIPE SUPPORT
Filed Feb. 4, 1954
3 Sheets-Sheet 3
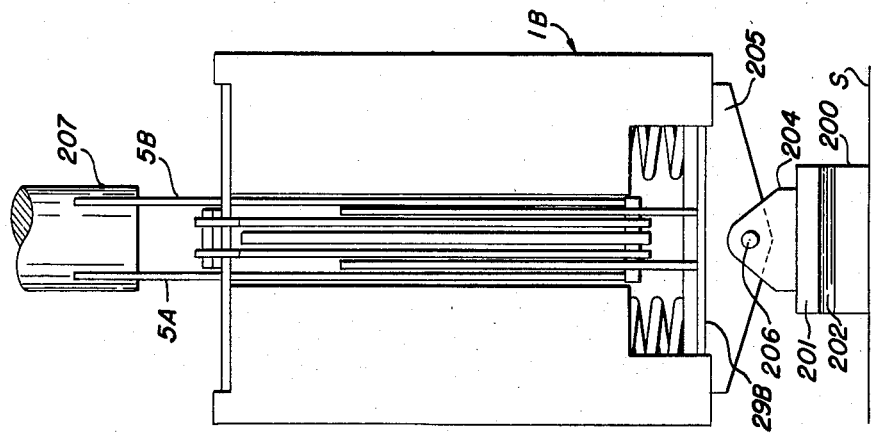
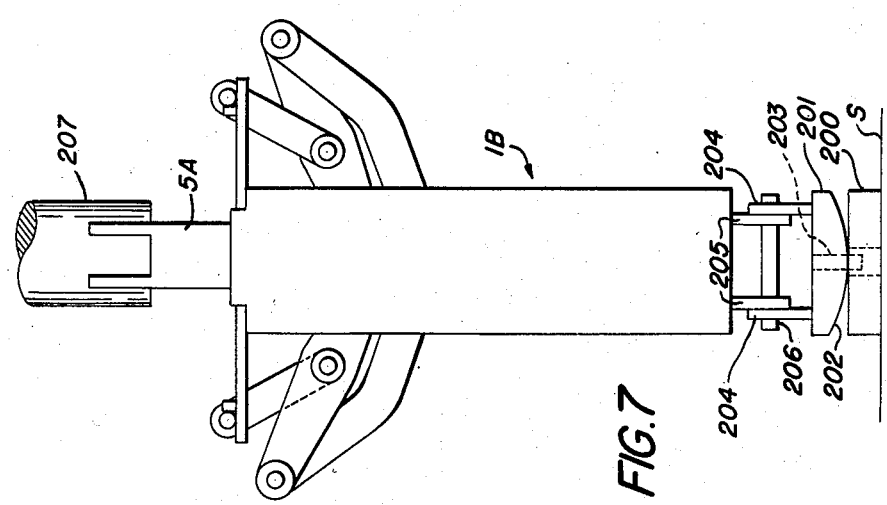
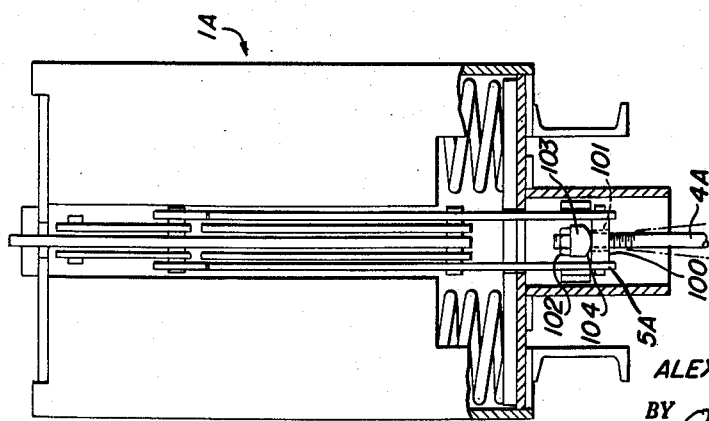
INVENTOR.
ALEXANDER V. ALEXEFF
BY *Oldham & Oldham*
ATTORNEYS United States Patent Office 2,867,399
Patented Jan. 6, 1959

2,867,399

UNIFORM TENSION PIPE SUPPORT

Alexander V. Alexeff, Barberton, Ohio, assignor to Oehler Development & Manufacturing Corporation, Akron, Ohio, a corporation of Ohio Application February 4, 1954, Serial No. 408,260

10 Claims. (Cl. 248—54)

This invention relates to uniform tension supports, such as are used for securing steam pipes or the like in position and wherein the support is able to move a relatively heavy supported article vertically when relatively small forces are applied to the supported article for moving it vertically in either direction.

It is a well known fact that many different types of pipes, such as those used in factories or other large buildings for carrying steam will expand and contract appreciably when in use. Thus it is difficult to position these steam pipes in a secure manner but still permit the required movement thereof. In a support of the class described, it would be highly desirable to have the support function to carry substantially constant loads in different vertical positions with the position of the supported articles being dependent upon minor fluctuations in the total load carried by the support.

The general object of the present invention is to provide a novel and improved uniform tension support for steam pipes or the like wherein the support is characterized by being adapted to carry substantially uniform loads over its operating range and wherein the supported article may move relatively widely without greatly changing the total support load carried thereby.

Another object of the invention is to provide a new type of a support made from a plurality of levers wherein the relative positions of the levers are varied to make the levers more efficient in load transfer action as the supported load moves over its operating range from no-load position.

A further object of the invention is to provide a relatively sturdy type of a support wherein the supported article is limited to reciprocating movement with relation to the support, or where the supported article has limited universal movement with relation to the support.

Another important object of the invention is to provide a support using a plurality of lever arms in novel relation to each other to avoid undesirable axial component forces in the lever arms and to increase the effective lengths of certain lever arms rapidly with change in the position of the supported article.

A further object of the invention is to provide a support member wherein compression springs are used for absorbing load carried by the support and wherein the operative capacity of the support can be varied by changing the number or characteristics of the springs used in the support.

The foregoing and other objects and advantages of the invention will be made more apparent as the specification proceeds.

In order to understand the invention completely, reference should be had to the accompanying drawings wherein one currently preferred embodiment of the principles of the invention is shown, and wherein:

Fig. 3 is a top plan of the support of Fig. 1 with a portion thereof being broken away and shown in section;

Figure 2:
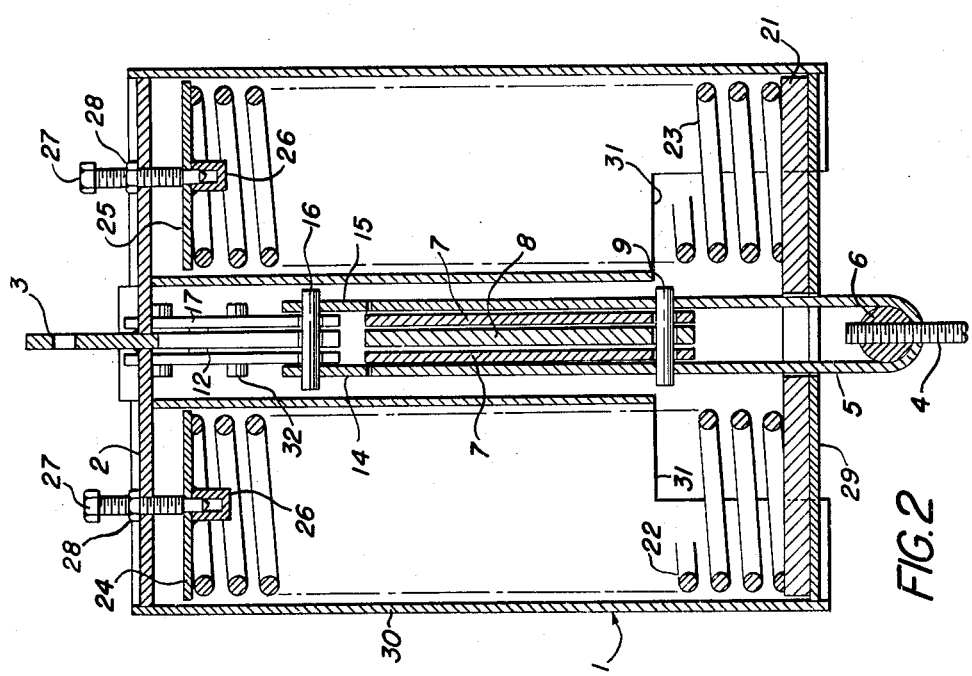
Fig. 2 is a vertical section taken on line 2—2 of Fig. 1.

Figs. 4 and 5 are vertical sections taken on lines 4—4 and 5—5 of Fig. 3 with the support being shown in Fig. 4 at about the mid-point of its operating range, and being shown in Fig. 5 at its fully loaded position at the bottom of its operating range;

Fig. 6 is a fragmentary elevation, partly broken away and shown in section, of a universal movement connector for the support of the invention;

Fig. 7 is a front elevation of a modified type of a support of the invention; and Fig. 8 is a side elevation of the support of Fig. 7.

In the accompanying drawings and the following specification, corresponding numerals will be used to refer to corresponding parts in the drawings and specification to facilitate comparison therebetween.

The present invention, in general, relates to hanger or support means including a top plate, a bottom plate secured to the top plate but spaced therefrom, a support member extending through the bottom plate for engaging a load to be supported, a forked plate member tightly engaging the support member and usually positioning such support member for reciprocation only, a pair of aligned links pivotally secured to the upper end of the support member and flaring apart at their upper ends, a rocker arm pivotally secured to the upper end of each of the links and extending from pivotally secured to the forked plate member at an upper portion thereof, a compression plate secured to the plate member at a lower portion thereof, coil springs compressed between the top plate and the compression plate, and hanger arms pivotally secured between the top plate and the rocker arms to support the rocker arms and load carried thereby.

The support, or hanger of the invention is indicated as a whole by the numeral 1 and it includes a top plate 2 which has any suitable means, such as a bracket 3, secured thereto and protruding up therefrom for use in securing the support 1 to a fixed article, or building for carrying the support 1 and load thereon. A load support rod, or load member 4 or other conventional load support member extends from the lower portion of the support member 1 and engages a special clevis 5 made of a U-shape bar with the rod 4 being secured to the base portion of the clevis 5 by a threaded portion of the rod 4 engaging a tapped aperture in a pin or stud 6 received in the base portion of the clevis. As indicated in Fig. 2, the clevis 5 may extend vertically of the hanger 1 more than half the height thereof, to position the rod 4 for vertical reciprocation as described hereinafter in more detail. The clevis 5 is a part of the load member 4 of the hanger 1.

Figure 1:
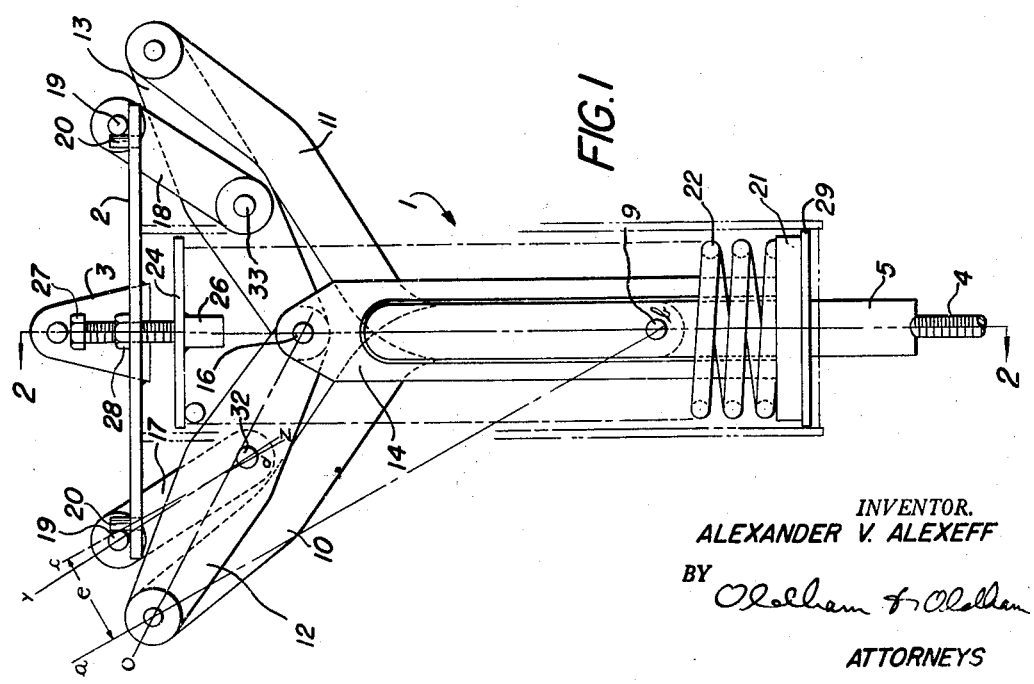
Fig. 1 is a side elevation of a support of the invention with the cover for the coil springs being indicated in chain dotted lines and with the support being at the top of its operating range.

A set of links 7 and 8 are pivotally secured to the clevis 5 intermediate the ends thereof by a journal pin 9. Usually two links 7 are provided one on each side of the links 8, as shown in Fig. 2. Fig. 1 of the drawings shows that the links 7 and 8 each have a vertically extending lower section substantially aligned with the rod 4 and clevis 5, whereas upper end sections 10 and 11 of the links 7 and 8, respectively, flare outwardly from each other, as indicated in the drawings. Each of the end sections 10 and 11 is pivotally secured to one end of one of a pair of rocker arms 12 and 13, respectively, provided in the support 1. These rocker arms 12 and 13 are pivotally secured at their other ends, which extend inwardly of the support 1, to a pair of elongate forked plates or guide means 14 and 15. The rocker arms 12 and 13 are secured to the forked plates 14 and 15 by a pin 16 extending through the rocker arms 12 and 13 and the forked plates 14 and 15 to make a unit therefrom.

In order to carry load on the support 1, a pair of hanger arms 17 and 18 are pivotally secured to the top plate 2, as by means of support pins 19, that are carried on the upper surface of the top plate 2, for example, and are retained against moving inwardly of the top plate by means of pins 20 or similar members provided on the upper surface of the top plate 2 and protruding therefrom.

Figs. 4 and 5 best show that the forked plates 14 and 15 are forked or divided at the lower ends thereof and that the upper end of the clevis 5 snugly and slidably protrudes in between the forked portions of such plates 14 and 15 so that the load supported or carried by the support 1 through the clevis 5 is adapted to be moved or reciprocated only directly along the longitudinal axis of the support 1.

To transmit load to the remainder of the apparatus, the forked plates 14 and 15 are secured, as by welding, at their lower ends to a compressor plate 21. This compressor plate 21 is shown as positioning a pair of coil springs 22 and 23 thereon with the upper ends of the coil springs bearing against, or seating on individual adjustment plates 24 and 25, as shown in Fig. 2. The adjustment plates 24 and 25 each may have a cup 26 suitably secured thereto, which cup receives the end of a threaded stud 27. The stud 27 is in threaded engagement with the top plate 2 and extends down to bear on the cup 26 so that rotary movement of the studs 27 can vary the vertical relationship between the adjustment plates 24 and 25 and the top plate 2 to vary the compression action on the coil springs 22 and 23. Suitable lock nuts 28 may be engaged with the studs 27 to secure them in a desired fixed position.

It should be noted that the compressor plate 21 in the no load position of the support 1 is adapted to bear on or seat on a bottom plate 29 provided in the support member and with such bottom plate 29 being rigidly secured to the top plate 2 by means of cylinders 30 that individually are positioned around the coil springs 22 and 23. These cylinders are provided with cut-out lower end sections 31 on the inner portion of the support 1 so that the cylinders 30 will not interfere in any manner with compressive action on the coil springs 22 and movement of the compressor plates 21. The cylinders 30 are secured in a conventional manner to the top plate 2 and bottom plate 29. The cylinders 30, bottom platform 29, and the top plate 2 form frame means for the hanger or support 1 of the invention.

Figs. 1, 4 and 5 show that the hanger or compensator arms 17 and 18 are pivotally secured to the rocker arms 12 and 13 by pins 32 and 33. An important feature of the invention is to position these pins 32 and 33 towards the center of the support from the center of the rocker arms, and below the horizontal center lines of the rocker arms as this rapidly increases the effective moment arms of the rocker arms as the supported article moves from its upper position towards lower positions.

By an inspection of the various positions of the support 1 of the invention as it is moved from the top to the bottom of its operative range, it will be seen that the effective positions of the links 7 and 8 and action of the associated lever means of the invention is such that substantially uniform loads can be carried by the support as it is moved through its operating range, even though the coil springs 22 and 23 have relatively widely varied forces applied thereto. With changes in loads on the springs 22 and 23, load changes are compensated for by the variations in the moment arm acting on the hanger arms 17 and 18 as forces are applied thereto through the upper end sections 10 and 11 of the links 7 and 8.

Fig. 1 shows an axial centerline Y—Z for the hanger or compensator arm 17. The low acute angle that the effective load line $a$—$b$ makes with the rocker arm 12 takes undesirable forces out of the rocker arms and aids in maintaining a balanced load on the springs 22 and 23 as the rod 4 is moved from its lower to its upper position. The drawings show how the effective line of load application on the links 7, for example, as indicated in line $a$—$b$ has a moment arm $e$ at the no-load or top position in the operating range of the support 1. Such moment arm $e$ is the perpendicular distance from the effective centerline $a$—$b$ of the link 7 to the center of the support pin 32. The line $c$—$d$ is parallel to the line $a$—$b$ but passes through the center of the pivot pin 32. In Fig. 4, the line $c'$—$d'$ likewise is parallel to the line $a'$—$b'$ and intersects the center of the pivot pin 32; likewise $c''$—$d''$ is parallel to $a''$—$b''$, the effective load line for the link 7 in Fig. 5, and passes through the center of pin 32. Thus the effective distance between the link 7 and the pivot pin 32 is measured by the moment arms $e$, $e'$ and $e''$ in the drawings. As the load moves downwardly, this moment arm rapidly changes to length $e^1$ at the mid-range point and to $e^{11}$ at the bottom extremity of the range to change the effective load transferred to the springs and give them greater loads at the lower portion of the operating range of the support 1. Stated in another manner, the rocker arms 12 and 13 make a small acute angle with the line of load application thereto by the links 7 and 8 at one extremity of movement of support rod 4, and make an angle of over 45° at the other extremity of position of such rod 4.

It will be seen that the pins 32 and 33 and similar members connecting the various levers and links of the support should be of a conventional low-friction, self-lubricating type.

It will be realized that the support of the invention can be made in various sizes and capacities by varying the strengths of the coil springs 22 and 23. Likewise, the compressor plates 21 can be made of larger area, as can the adjustment plates 24 and 25, so that a plurality of coil springs, usually four, six or eight springs can be used in place of the two coil springs shown in this embodiment of the invention.

Any desired type of an article can be carried by the novel retaining and positioning support 1 of the invention but the positioning of steam pipes is one particularly desirable use of the support of the invention. One embodiment of the support 1, using springs totaling 600 lbs. therein, could be moved from its upper to its lower limit of movement by loads of from 582 to 618 lbs. and this load variation is submitted to be less than the variation in load supporting properties in springs as produced commercially.

Fig. 6 shows a modified type of a hanger or support 1A of the invention and wherein a special universal joint member is provided in the load support means of the support of the invention. Thus limited movement, such as five degrees, of a rod 4A is permitted by the special support means provided. The load support, or load member also includes a member 5A that, like the clevis 5 in Figs. 1 and 2, comprises two spaced support arms projecting downwardly from the support 1A and a support pin 100 is pivotally carried by and extends between these arms in the member 5A. The load support rod 4A extends through a hole 101 provided in this support pin 100 with such hole 101 being slightly larger in diameter than the external diameter of the rod 4A so that limited movement of the rod with relation to its positioning means is permitted. The upper end of the load support rod 4A may carry a lock nut 102 which retains a positioning member or nut 103 on the load support rod and this positioning nut 103 has a curved surface that bears on the support pin 101 and permits relative movement of the load support rod 4A in any direction. The curved surface 104 of the nut 103 may be of spherical contour, or it may merely be curved in a direction extending between the arms of the member 5A, as desired, if the member 101 is pivotally positioned by the support arms. In all events, limited universal movement is provided to enable the support or hanger member of the invention to have improved functioning in a wide variety of operating conditions.

Figs. 7 and 8 show further modification of a support or hanger 1B of the invention. In this embodiment of the invention, the base portion of the support 1B is adapted to be fixedly secured to a carrier member by means of a base plate 200 which is suitably secured to a fixed support S. A mounting plate 201 that has a curved surface 202 extending transversely thereof is in bearing engagement with the upper portion of the mounting plate 201 and is secured thereto for relative movement therebetween, as by a pin 203. This mounting plate 201 preferably has a pair of bracket plates, or similar means 204 secured thereto or otherwise fixedly carried thereby and extending upwardly therefrom in opposed relation. A bottom plate 29B of the support 1B has a pair of mounting brackets or plates 205 extending downwardly therefrom and a pin 206 extends through the bracket plates 204 and the brackets 205 to secure the support 1B pivotally to the base plate 200 whereby universal movement of the support 1B in a limited arc, such as ten degrees, is permitted. In this support 1B, support arms 5B of the support protrude upwardly of the support for receiving and transmitting loads to the support and they may have a member, such as a tubular column 207, secured to the upper ends thereof and through which the support 1B is connected to the load to be positioned thereby.

It should be realized that the universal joint load connecting means shown in Figs. 6 through 8 may be used with the embodiment of the invention completely shown in Figs. 1 through 5 of the drawings and that the supports or hangers 1A and 1B are of substantially the same construction as the support 1 with the modifications referred to hereinabove. Thus, the load support means 5A and 5B transmit load to a member like the clevis 5.

While several complete embodiments of the invention have been disclosed herein, it will be appreciated that modification of these particular embodiments of the invention may be resorted to without departing from the scope of the invention as defined in the appended claims.

What is claimed is:

1. A hanger comprising a top plate, means for securing the top plate to a support, a support load member, a pair of angular links pivotally secured to said support member and having diverging upper ends and aligned lower portions, a pair of rocker arms pivotally connected at outer ends thereof to the upper ends of said links and extending in towards each other, said rocker arms and the axis of load applied thereto by said links forming a small acute angle at no load and forming an angle of over 45° at full load, a pair of hanger arms pivotally carried by said top plate with each hanger arm pivotally secured to a different one of said rocker arms intermediate the ends thereof, a plate member pivotally secured to the inner ends of said rocker arms and engaging said load member for reciprocatory movement only therebetween, a compressor plate secured to the lower end of said plate member, and coil spring means compressed between and reacting against said compressor plate and said top plate.

2. In a hanger, a top plate, a bottom plate secured to said top plate and spaced therefrom, a load member extending through said bottom plate, a forked plate member slidably engaging said load member to position it for reciprocation only, a pair of links pivotally secured to said support member and flaring apart at their upper ends, rocker arms pivotally secured to and extending between the upper ends of said links and said plate member, a compression plate secured to said forked plate member and engaging said bottom plate at no load, coil springs in compression between and reacting against said top plate and said compression plate, and hanger arms pivotally secured between said top plate and said rocker arms to support said rocker arms and load thereon and extending inwardly of the hanger.

3. A hanger comprising frame means including a top plate, universal movement means for securing the frame means to a support, a load member, a pair of angular links pivotally secured to said load member, a pair of rocker arms pivotally connected at outer ends thereof to the upper ends of said links and extending in towards each other, a pair of hanger arms pivotally carried by said top plate with each hanger arm pivotally secured to a different one of said rocker arms intermediate the ends thereof, a plate member pivotally conected to the inner ends of said rocker arms, said plate member engaging said load member to limit it to movements along its longitudinal axis, a compressor plate secured to the lower end of said plate member and positioned by said frame means for limited movement, and spring means compressed between and reacting against said compressor plate and said top plate.

4. A hanger comprising frame means including a top plate, a support member, a pair of angular links pivotally secured to said support member for positioning it, a pair of rocker arms pivotally connected at outer ends thereof to the upper ends of said links and extending in towards each other, a pair of hanger arms pivotally carried by said top plate with each hanger arm extending to and being pivotally secured to a different one of said rocker arms intermediate the ends thereof, a plate member pivotally secured to and positioned by the inner ends of said rocker arms, said plate member having a compression plate section thereon, said plate member being movably positioned by said rocker arms, and spring means positioned within said frame means and compressed between said compression plate section and said top plate, said support member being movable vertically of said frame means and compressing said springs by such movement.

5. A hanger comprising a top plate, means for securing the top plate to a positioning means, a load member having a limited movement with relation to said top plate, a pair of links pivotally secured to said load member, a pair of rocker arms pivotally connected at outer ends thereof to the upper ends of said links and extending in towards each other, a pair of hanger arms pivotally carried by said top plate with each hanger arm pivotally secured to a different one of said rocker arms intermediate the ends thereof, a plate member pivotally secured to the inner ends of said rocker arms, a compressor plate secured to the lower end of said plate member, and coil spring means compressed between and acting against said compressor plate and said top plate, the effective moment arms of said rocker arms for forces transmitted to said hanger arms increasing from one extreme position of said load member to the other extreme position of such load member.

6. In a hanger, a top plate, a load member, a plate means slidably receiving and engaging with said load member to position it for reciprocation only along the vertical axis of the hanger, a pair of links pivotally secured to said load member to receive load therefrom, rocker arms pivotally secured to and extending between the upper ends of said links and to said plate means, a compression plate secured to said plate means, springs in compression between and reacting against said top plate and said compression plate, and hanger arms pivotally secured between said top plate and said rocker arms to support said rocker arms and load thereon whereby load is transmitted from said links through said rocker arms and plate means to said springs for compression thereof.

7. A hanger as in claim 6 wherein a universally movable support is provided for the hanger, means to secure said support to said bottom, and said support member extends up through said top plate for engaging a load.

8. In a hanger, a top plate, a load member, a plate member slidably engaging said load member to position it for reciprocation only along the vertical axis of said load member, a pair of links pivotally secured to said load member, rocker arms pivotally secured to the upper ends of said links and to said plate member, a compression plate secured to said plate member, coil springs in compression between and reacting against said top plate and said compression plate, and hanger arms pivotally secured between said top plate and said rocker arms to support said rocker arms and load thereon, said rocker arms having corresponding ends thereof at a center portion of the hanger and with such rocker arms diverging from the center of the hanger, said hanger arms being secured to said rocker arms offset from the centers thereof towards the center portion of the hanger.

9. In a hanger, frame means including a top plate but adapted to be supported from the bottom thereof, a load member, a plate member slidably engaging said load member to position it for reciprocation only along the vertical axis of the hanger, a pair of links pivotally secured to said load member, rocker arms pivotally secured to the upper ends of said links and to said plate member, lines from the pivotal connections of said links to said load member to the pivotal connection of said links to said rocker arms determining the axes of load application thereto, said rocker arms forming small acute angles with the axes of potential loads applied thereto under no load conditions and increasing such angle on load application, a compression plate secured to a lower portion of said plate member, coil springs in compression between and reacting against said top plate and said compression plate, and hanger arms pivotally secured between said top plate and said rocker arms to support said rocker arms and load thereon, said load member including a load support rod, and universal joint means connecting said load support rod to the remainder of said load member.

10. In a hanger, frame means including a top plate, a load member, an elongate plate member slidably engaging said load member to position it for reciprocation along only its longitudinal axis, a pair of links pivotally secured to said load member, rocker arms pivotally secured to upper portions of said links and to said plate member to receive load from said links, a compression plate secured to said plate member and engaging said frame means for limited movement, coil springs in compression between and reacting against said top plate and said compression plate, and hanger arms pivotally secured between said top plate and said rocker arms to support said rocker arms and load thereon, said load member including a load support rod, and universal joint means connecting said load support rod to the remainder of said load member.

References Cited in the file of this patent

UNITED STATES PATENTS

| | | |
|---|---|---|
| 2,035,446 | Barrett | Mar. 31, 1936 |
| 2,568,149 | Grabe | Sept. 18, 1951 |